C. F. JENKINS.
APPARATUS FOR MAKING SPIRALLY WOUND TUBES.
APPLICATION FILED JUNE 24, 1908.
941,255. Patented Nov. 23, 1909.
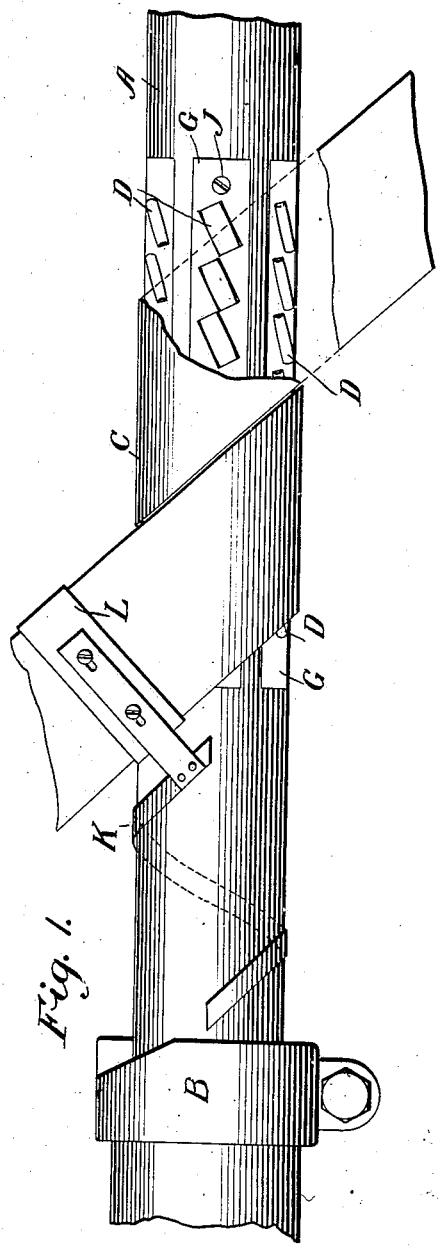
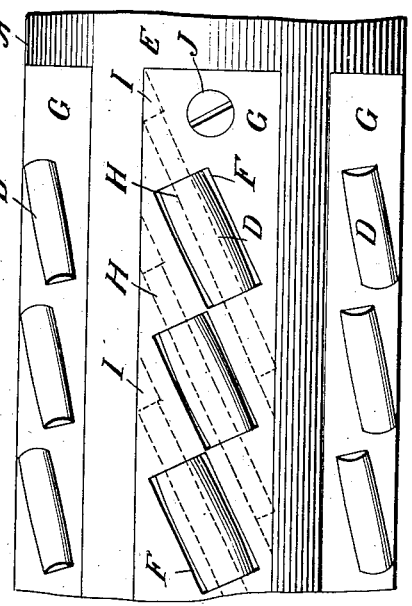
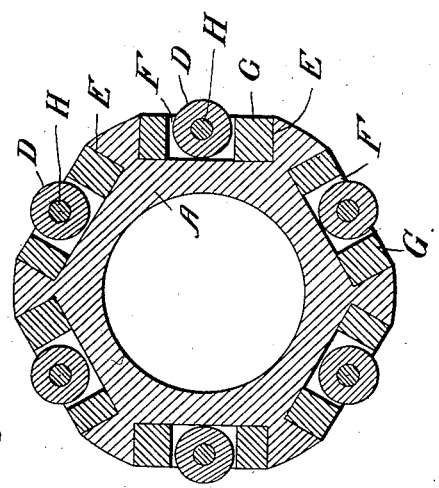
Witnesses
Jos. F. Collins.
R. Craig Greene.
Inventor
Charles Francis Jenkins
By Wallace Greene,
Attorney.

UNITED STATES PATENT OFFICE.

CHARLES FRANCIS JENKINS, OF WASHINGTON, DISTRICT OF COLUMBIA, ASSIGNOR, BY MESNE ASSIGNMENTS, TO SINGLE SERVICE PACKAGE CORPORATION OF AMERICA, A CORPORATION OF NEW JERSEY.

APPARATUS FOR MAKING SPIRALLY-WOUND TUBES.

941,255. Specification of Letters Patent. Patented Nov. 23, 1909.

Application filed June 24, 1908. Serial No. 440,175.

*To all whom it may concern:*

Be it known that I, CHARLES FRANCIS JENKINS, citizen of the United States, residing at Washington, in the District of Columbia, have invented certain new and useful Improvements in Apparatus for Making Spirally-Wound Tubes, of which the following is a specification, reference being had therein to the accompanying drawing.

It is common to form tubes by winding relatively narrow strips upon a cylindrical mandrel and to do this automatically and very rapidly by means of an endless belt oblique to the axis of a mandrel and having one of its folds making a turn around the latter, the strips being fed between the belt and mandrel, upon which they are firmly pressed by the belt. The belt at the same time that it forms the strips upon the mandrel causes them to slide around the same and at the same time to slip toward its free end. The operativeness of the apparatus depends upon having the frictional hold of the belt upon the strips stronger than the frictional hold of the strips upon the mandrel, and with the proper belt and a very smooth mandrel certain kinds of stock may be used with little difficulty. With other kinds of stock, however, the operation of such devices is not satisfactory. In making paper tubes, for example, where superposed thin overlapping gummed strips are used, serious difficulty is often found, for strong pressure is needed to secure proper adhesion of the gummed strips at every point, and with this pressure the belt may slip on the paper, or the thin stock be wrinkled or the edges may overlap or be distorted, especially if any gum chance to reach the mandrel, and in any case much power is needed. Practically it is also found that the difficulties increase with speed of operation, and that thereby the output is limited. It is obvious also that if the friction of the belt on the stock be at any time increased by increasing the tension, the friction of the stock upon the mandrel is also increased so that nothing is gained.

The object of this invention is to eliminate all these difficulties by lessening the friction of the stock upon the mandrel without lessening the friction of the belt upon the stock. This object is attained by means of devices illustrated in the accompanying drawings, in which, Figure 1 is a plan view of a novel mandrel and devices coöperating therewith. Fig. 2 is a like view of a portion of the same mandrel shown on a larger scale. Fig. 3 is a cross section of the mandrel.

In these figures, A represents a mandrel, preferably hollow, as shown, and rigidly held by any suitable device such as a clamp B. Around this mandrel is wound one fold C of the usual oblique endless belt. That segment of the roller upon which the belt presses is provided with rollers D each mounted to rotate in a plane parallel to the line of the belt's travel and each projecting slightly outside the general surface of the mandrel. The form of the rollers may be greatly varied and they may even be spherical, but I prefer the form shown, in which the rollers are sunk in the surface of the mandrel, set obliquely and barrel-shaped or tapered from the middle toward each end in such manner that the lines of contact of the rollers with a tube formed upon the mandrel will extend from end to end of the rollers, respectively, and will be parallel to and slightly without the general cylindrical surface of the mandrel. For thus mounting the rollers I have shown the mandrel as provided with six equally spaced longitudinal recesses E each adapted to receive a rectilineal series of rollers. The rollers of each series are mounted in apertures F in flat bars G to rotate on shafts H, the bars G being laterally notched at I to facilitate construction. The rollers of each series being thus mounted the several bars are inserted in the corresponding recesses, which they preferably, fill and are removably fixed in place by screws J. The enveloping fold of the belt is wound about this roller bearing segment of the mandrel, as shown in Fig. 1, upon which the formed stock slips perfectly and with the application of very little power, whatever the tension of the belt. It is very desirable the contiguous edges of the stock strips should be firmly pressed together but without such pressure as to injure the edges even when the stock is of paper, and if there is some difficulty in causing the belt to run with perfect accuracy upon precisely the same portion of the surface of the mandrel, a belt-governed paper-guide is provided. This consists of smooth metal strip K wound spirally, at the proper angle, about the mandrel at one side of the belt, in such manner that it fits the mandrel closely yet slides freely thereon. This strip is connected to a clip L through which the belt passes, the proportions being such that one edge of the strip is at precisely the proper distance from the belt to serve as a guide for one edge of the stock strip. If now the fold of the belt varies in position with respect to the mandrel, the position of the guide, and of the stock strip, is correspondingly varied automatically. Practically, it is found that while much power is saved, the speed of operation may safely be increased so as to increase very largely the output of the machine, and at the same time all the difficulties mentioned at the outset disappear, even gum upon the mandrel causing neither vexation nor delay.

Obviously, the construction set forth need not be closely followed, and I desire to claim my invention both broadly and specifically.

What I claim is:

1. In a machine for making spirally wound tubes, the combination with a mandrel having a belt-receiving segment which is provided with rollers projecting slightly outside its general surface, of a tube forming belt passing obliquely around said segment.

2. A mandrel, for use in making paper tubes, provided at various points around its lateral surface with a series of rollers, mounted in the mandrel to project slightly from said surface and to rotate in planes transverse to the mandrel axis.

3. A mandrel provided with a plurality of relatively small rollers mounted in the mandrel to project slightly from its surface and to rotate upon their own axes in planes oblique to the axis of the mandrel.

4. A mandrel provided with a plurality of approximately parallel rollers mounted in the mandrel, oblique to its axis, to project slightly beyond its general surface, all points in the outermost surface element of each roller being at approximately the same distance from the axis of the mandrel.

5. The combination with a mandrel and a tube forming belt passing obliquely around the same, of a stock-strip guide, and means whereby the belt in moving longitudinally with respect to the mandrel automatically causes a corresponding movement of said guide.

6. The combination with a mandrel and a tube-forming belt passing around the mandrel, of a movable stock-strip guide alongside the belt and a loop loosely embracing the belt and connected to said guide.

In testimony whereof I affix my signature in presence of two witnesses.

CHARLES FRANCIS JENKINS.

Witnesses:
JAMES L. CRAWFORD,
R. CRAIG GREENE.